(12) United States Patent
Shi et al.

(10) Patent No.: US 9,983,432 B1
(45) Date of Patent: May 29, 2018

(54) LIQUID CRYSTAL DISPLAY INCLUDING DIELECTRIC MIRROR FOR RECYCLING LIGHT

(71) Applicant: Oculus VR, LLC, Menlo Park, CA (US)

(72) Inventors: Jianru Shi, Union City, CA (US); Fenglin Peng, Orlando, FL (US)

(73) Assignee: Oculus VR, LLC, Menlo Park, CA (US)

( * ) Notice: Subject to any disclaimer, the term of this patent is extended or adjusted under 35 U.S.C. 154(b) by 0 days. days.

(21) Appl. No.: 15/674,395

(22) Filed: Aug. 10, 2017

Related U.S. Application Data

(60) Provisional application No. 62/373,953, filed on Aug. 11, 2016.

(51) Int. Cl.
| | | |
|---|---|---|
| *G02F 1/1335* | (2006.01) | |
| *G02F 1/1368* | (2006.01) | |
| *G02F 1/1362* | (2006.01) | |
| *G02B 5/08* | (2006.01) | |

(52) U.S. Cl.
CPC ..... *G02F 1/133553* (2013.01); *G02B 5/0833* (2013.01); *G02F 1/1368* (2013.01); *G02F 1/133514* (2013.01); *G02F 1/133528* (2013.01); *G02F 1/136209* (2013.01); *G02F 2201/50* (2013.01)

(58) Field of Classification Search
CPC ........... G02F 1/13353; G02F 1/133555; G02F 2001/133557
See application file for complete search history.

(56) References Cited

U.S. PATENT DOCUMENTS

| | | | |
|---|---|---|---|
| 2005/0122452 A1* | 6/2005 | Yoshida | G02F 1/133555 349/114 |
| 2016/0161650 A1* | 6/2016 | Taraschi | G02B 5/28 349/70 |
| 2016/0313602 A1* | 10/2016 | Xie | G02F 1/133555 |
| 2017/0277000 A1* | 9/2017 | Shi | G02F 1/133553 |

* cited by examiner

*Primary Examiner* — Phu Vu
(74) *Attorney, Agent, or Firm* — Fenwick & West LLP

(57) ABSTRACT

An electronic display comprises a backlight unit and a liquid crystal (LC) layer, where the backlight combines and directs light from a plurality of light sources towards the LC layer, which controls an amount of light to be displayed. The LC layer is controlled by a plurality of thin-film transistors (TFT) disposed on a TFT layer. To prevent light from the backlight from being absorbed by the TFTs, a dielectric mirror is disposed between the transistors and the backlight unit to reflect light from the backlight unit that is projectors towards the transistors back towards the backlight unit. Hence, light can be recycled and travel through an aperture between the dielectric mirrors, thereby improving luminance.

13 Claims, 4 Drawing Sheets

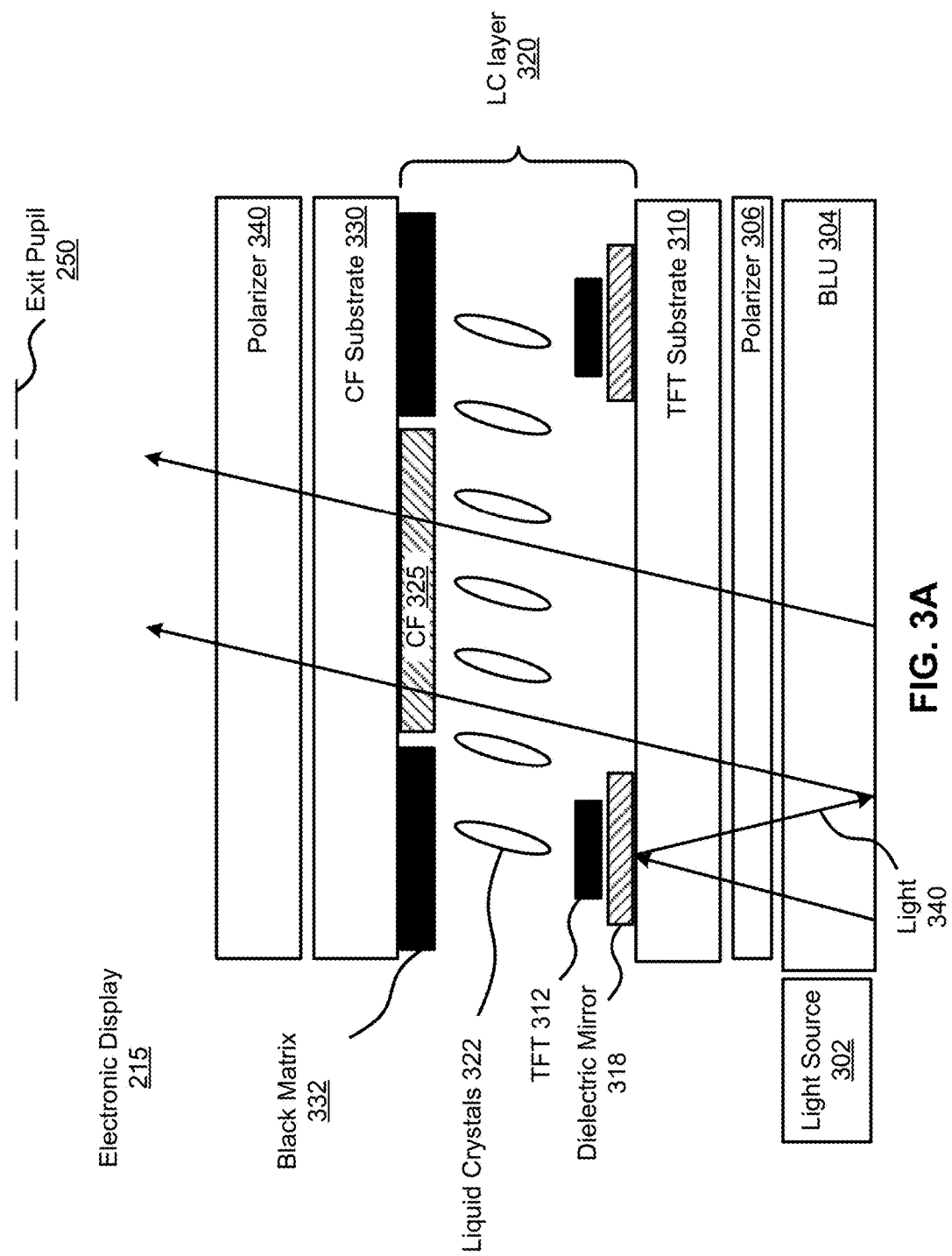

LIQUID CRYSTAL DISPLAY INCLUDING DIELECTRIC MIRROR FOR RECYCLING LIGHT

CROSS REFERENCE TO RELATED APPLICATIONS

This application claims the benefit of U.S. Provisional Application No. 62/373,953, filed Aug. 11, 2016, which is incorporated by reference in its entirety.

BACKGROUND

The present disclosure generally relates to a liquid crystal display device.

Liquid crystal displays typically comprise a backlight unit and a liquid crystal (LC) layer. The backlight unit contains a light source and is configured to project light from the light source towards the LC layer, which modulates an amount of light from the backlight to be displayed. An amount of light that is able to pass through different portion of the LC layer may be controlled using a plurality of thin film transistors (TFTs).

BRIEF DESCRIPTION OF THE DRAWINGS

FIG. 3A is a cross section diagram of an electronic display with a dielectric mirror, in accordance with an embodiment.

Figure 1:
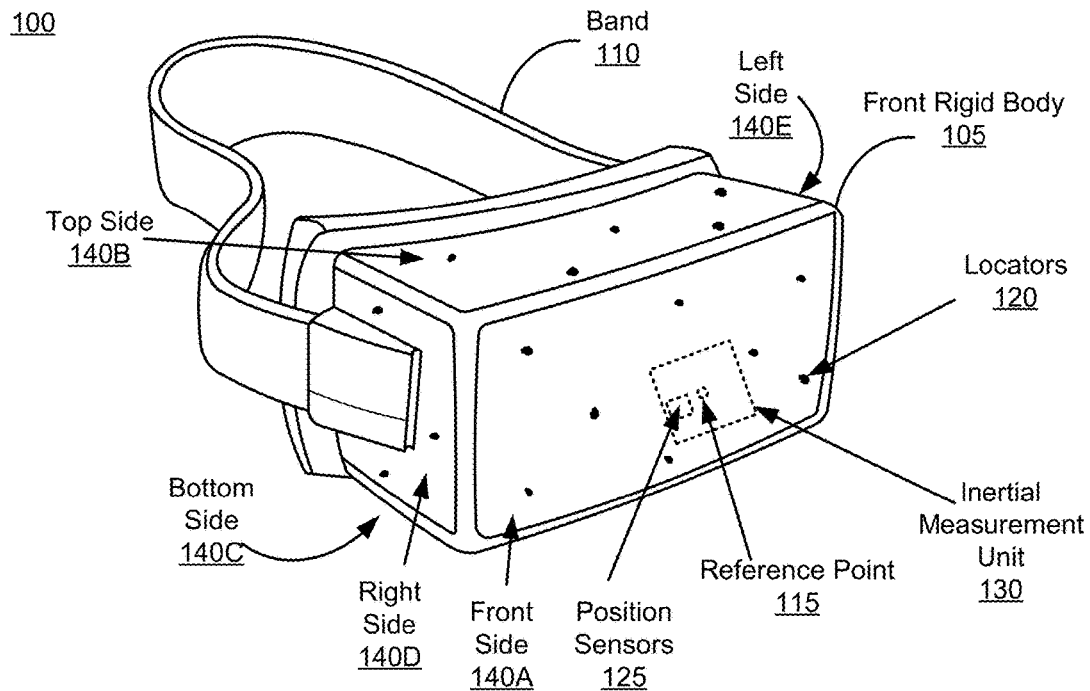
FIG. 1 is a diagram of a headset, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

SUMMARY

In embodiments of the invention, an electronic display device includes a backlight unit that projects light towards a liquid crystal layer, which receives the light from the backlight unit and controls an amount of light from the backlight unit to be displayed. The electronic display further comprises a thin film transistor (TFT) layer disposed between the backlight unit and the liquid crystal layer, comprising one or more TFTs each controlling an amount of light from the backlight unit to displayed by a respective portion of the liquid crystal layer. One or more dielectric mirrors are each disposed on a surface of a respective TFT facing the backlight unit and reflect light from the backlight unit projected towards the TFTs back towards the backlight unit.

Because the TFTs are disposed between the backlight unit and the liquid crystal layer, at least a portion of the light projected by the backlight unit may be projected towards the TFTs. The dielectric mirror, being disposed between the TFTs and the backlight unit, can shield the TFTs from being exposed to light from the backlight unit. As a result, degradation of characteristic the TFTs (e.g., leakage) due to light through the backlight unit can be prevented. In addition, light traveling towards the TFTs is reflected back to the backlight unit rather than being absorbed by the TFTs, allowing for the light projected towards the TFTs to be recycled. The recycled light can then be reflected by the backlight unit, and travel to the liquid crystal layer through spaces between the TFTs and the dielectric mirrors. By recycling the light projected towards the TFTs, the luminance of the display device may be improved.

DETAILED DESCRIPTION

Configuration Overview

Example embodiments of disclosed configurations include a liquid crystal display (LCD) device having a dielectric mirror for improving luminosity and protecting circuitries in the liquid crystal display.

In one or more embodiments, the disclosed liquid crystal display device includes a liquid crystal layer, a backlight unit, transistors, and dielectric mirrors. The backlight unit emits light towards the liquid crystal layer. The transistors (e.g., thin film transistors) are disposed between the backlight unit and the liquid crystal layer, and configure a formation of liquid crystals of the liquid crystal layer to control an amount of light passing through the liquid crystal layer. The dielectric mirrors are disposed between the transistors and the backlight unit. In this configuration, the dielectric mirrors reflect light towards the transistors from the backlight unit back to the backlight unit. Hence, light can be recycled and travel through an aperture between the dielectric mirrors, thereby improving luminance. Moreover, the dielectric mirrors protect the transistors from being exposed to light, thereby preventing degradation (e.g., leakage current) in characteristic of the transistors.

System Overview

FIG. 1 is a diagram of a headset 100, in accordance with an embodiment. In one embodiment, the headset 100 includes a front rigid body 105 and a band 110. The front rigid body 105 includes an electronic display (not shown), an inertial measurement unit (IMU) 130, one or more position sensors 125, and locators 120. In one embodiment, a user movement is detected by use of the inertial measurement unit 130, position sensors 125, and/or the locators 120, and an image is presented to a user through the electronic display according to the user movement detected. In one embodiment, the headset 100 can be used for presenting a virtual reality, an augmented reality, or a mixed reality to a user.

A position sensor 125 generates one or more measurement signals in response to motion of the headset 100. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof. In the embodiment shown by FIG. 1, the position sensors 125 are located within the IMU 130, and neither the IMU 130 nor the position sensors 125 are visible to the user.

Based on the one or more measurement signals from one or more position sensors 125, the IMU 130 generates calibration data indicating an estimated position of the headset 100 relative to an initial position of the headset 100. In some embodiments, the IMU 130 rapidly samples the measurement signals and calculates the estimated position of the headset 100 from the sampled data. For example, the IMU 130 integrates the measurement signals received from the accelerometers over time to estimate a velocity vector and integrates the velocity vector over time to determine an estimated position of a reference point on the headset 100. Alternatively, the IMU 130 provides the sampled measurement signals to a console (e.g., a computer), which determines the calibration data. The reference point is a point that may be used to describe the position of the headset 100. While the reference point may generally be defined as a point in space; however, in practice the reference point is defined as a point within the headset 100 (e.g., a center of the IMU 130).

The locators 120 are located in fixed positions on the front rigid body 105 relative to one another and relative to a reference point 115. In the example of FIG. 1, the reference point 115 is located at the center of the IMU 130. Each of the locators 120 emits light that is detectable by an imaging device (e.g., camera or an image sensor). Locators 120, or portions of locators 120, are located on a front side 140A, a top side 140B, a bottom side 140C, a right side 140D, and a left side 140E of the front rigid body 105 in the example of FIG. 1.

Figure 2:
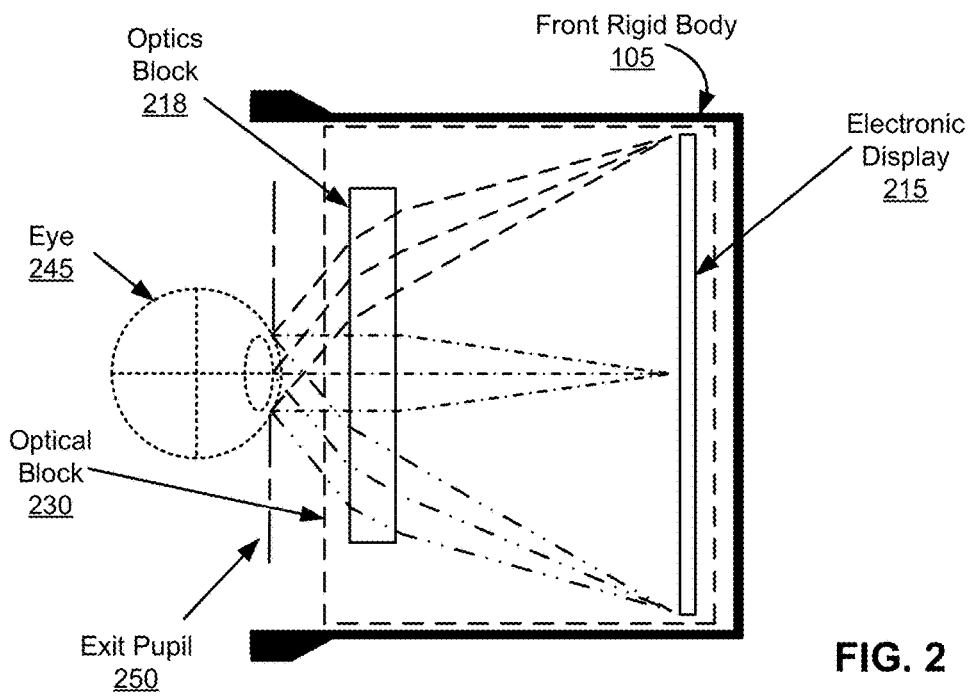
FIG. 2 is a cross section of a front rigid body of the headset in FIG. 1, in accordance with an embodiment.

FIG. 2 is a cross section 225 of the front rigid body 105 of the embodiment of the headset 100 shown in FIG. 1. As shown in FIG. 2, the front rigid body 105 includes an optical block 230 that provides altered image light to an exit pupil 250. The exit pupil 250 is the location of the front rigid body 105 where a user's eye 245 is positioned. For purposes of illustration, FIG. 2 shows a cross section 225 associated with a single eye 245, but another optical block, separate from the optical block 230, provides altered image light to another eye of the user.

The optical block 230 includes an electronic display 215, and the optics block 218. The electronic display 215 emits image light toward the optics block 218. The optics block 218 magnifies the image light, and in some embodiments, also corrects for one or more additional optical errors (e.g., distortion, astigmatism, etc.). The optics block 218 directs the image light to the exit pupil 250 for presentation to the user. In one or more embodiments, the optics block 218 may be omitted.

LCD Structure

FIG. 3A is a cross section diagram of an electronic display 215 with a dielectric mirror, in accordance with an embodiment. The electronic display 215 shown in FIG. 3A is a liquid crystal display (LCD). In one embodiment, the electronic display 215 includes a backlight unit 304, a first polarizer 306, a thin film transistor (TFT) substrate 310, a liquid crystal layer 320, a color filter (CF) substrate 330, and a second polarizer 340 disposed in that sequence towards the exit pupil 250. The electronic display 215 further includes a light source 302 coupled to a side of the backlight unit 304. Moreover, the electronic display 215 includes dielectric mirrors 318 disposed on a surface of the TFT substrate 310 facing towards the exit pupil 250, and TFTs 312 disposed on the dielectric mirrors 318. Furthermore, the electronic display 215 includes a black matrix 332 disposed on a surface of the CF substrate 330 facing away from the exit pupil 250, and a CF 325 disposed in a space between the black matrix 332 (i.e., an aperture) on the surface of the CF substrate 330. In other embodiments, the electronic display 215 includes different, more or fewer components than shown in FIG. 3A.

The light source 302 is an electrical component that generates light. The light source 302 may comprise a light emitting component (e.g., a light emitting diode (LED), a light bulb, or other components for emitting light).

The backlight unit 304 receives light from the light source 302, and projects the light towards the exit pupil 250. The backlight unit 304 may comprise a lightguide, and a bottom reflective sheet (not shown) on a surface of the lightguide facing away from the exit pupil 250, brightness enhanced films and diffusers. The lightguide may be composed of a glass material or a transparent plastic material, and the bottom reflective sheet may be composed of metal or other reflective materials. The light source 302 is positioned at the edge of the BLU 304 and emits light into the light guide of the backlight unit 304. Although depicted as separate components, the light source 302 and BLU 304 may be combined to be a single component. The light guide plate uniformly distributes the light in the area of the display to be illuminated. Light that enters the light guide plate may reflect off the bottom reflective sheet before exiting the upper surface of the light guide plate and BLU 304 facing the exit pupil 250.

The polarizer 306 is an optical filter that receives light from the backlight unit 304, and polarizes the received light into a particular polarization. The polarizer 306 emits the polarized light to the TFT substrate 310.

The TFT substrate 310 is a body on which the dielectric mirrors 318 and the TFTs 312 are disposed. The TFT substrate 310 is implemented with a transparent material (e.g., glass or transparent plastic), thus light from the backlight unit 304 through the polarizer 306 can pass through the TFT substrate 310 to the LC layer 320. The dielectric mirrors 318 may be dispersed on an inner surface of the TFT substrate 310 and patterned to cover the TFT substrate 310 except apertures, and the TFTs 312 are disposed on corresponding dielectric mirrors 318. A TFT 312 controls an amount of light passing through a respective portion of the LC layer 320 corresponding to a pixel. A dielectric mirror 318 between the backlight unit 304 and the TFT 312 reflects light towards the TFT 312 from the backlight unit 304 back to the backlight unit 304.

In one embodiment, a width of the dielectric mirror 318 along a surface of the TFT substrate 310 is equal to or longer than a width of the TFT 312. Hence, the dielectric mirror 318 can shield the TFT 312 from being exposed to light traveling through the backlight unit 304. As a result, degradation of characteristic the TFT 312 (e.g., leakage) due to light through the backlight unit 304 can be prevented. Moreover, light traveling towards the TFT 312 is reflected back to the backlight unit 304 rather than being absorbed by the TFT 312, thus the light towards the TFTs 312 can be recycled. The recycled light can then be reflected by the backlight unit 304, and travel to the liquid crystal layer 320 through a space between the TFTs 312 or a space between the dielectric mirrors 318.

In one aspect, the dielectric mirror 318 is implemented with low metallic property. Material property can be described by two material parameters, n and k, defined as a complex index n+ik, where n is a refractive index, describing the dielectric response of material, and k is an extinction coefficient, describing the metallic response of material. Dielectric materials may include silicon oxide (SiOx), silicon nitride (SiNx), or titanium oxide (TiOx), which have low metallic property (and ideally no metallic property with k=0). Materials with high metallic property can degrade or affect TFT 312 characteristics, for example, by adding undesirable capacitance. By implementing mirrors with dielectric materials, the dielectric mirror 318 can be placed underneath the TFT 312 to protect the TFT 312 from being exposed to light without altering the characteristics of the TFT 312.

The liquid crystal layer 320 receives light from the backlight unit 304 through the TFT substrate 310, and passes light from the backlight unit 304 towards the exit pupil 250.

The liquid crystal layer 320 includes a plurality of liquid crystals 322, and configurations of the liquid crystals 322 can be changed according to corresponding TFTs. In one example, a first portion of the liquid crystals 322 corresponding to a first pixel of an image passes through 30% of light from the backlight unit 304, and a second portion of the liquid crystals corresponding to a second pixel of the image passes through 80% of light from the backlight unit 304. Thus, the liquid crystal layer 320 can pass through different amount of light for different pixels.

The CF substrate 330 is a body on which the black matrix 332 and the color filter 325 are disposed. The CF substrate 330 is implemented with a transparent material (e.g., glass or transparent plastic), thus light from the LC layer 320 can travel towards the exit pupil 250. The black matrix 332 is disposed on a surface of the CF substrate 330 facing the liquid crystal layer 320, and the color filter 325 is disposed on a space between the black matrix 332 (i.e., aperture). The black matrix 332 may be disposed over the TFTs 312 and the dielectric mirrors 318. The black matrix 332 includes materials that absorb light, thus prevents light within a pixel from traversing to another pixel. The color filter 325 in the aperture between the black matrixes 332 receives light from the liquid crystal layer 320, and passes through a filtered light including a desired color to the exit pupil 250 through the color filter substrate 330. Hence, light passing through the color filter 325 can be observed with a desired color (e.g., red, blue, or green).

The polarizer 340 is an optical filter that receives light from the CF substrate 330, and polarizes the received light into a particular polarization. The polarizer 340 is disposed on a surface of the color filter substrate 330 facing the exit pupil 250. The polarizer 340 modulates the received light to obtain a polarized light, emits the polarized light to the exit pupil 250.

Figure 3B:
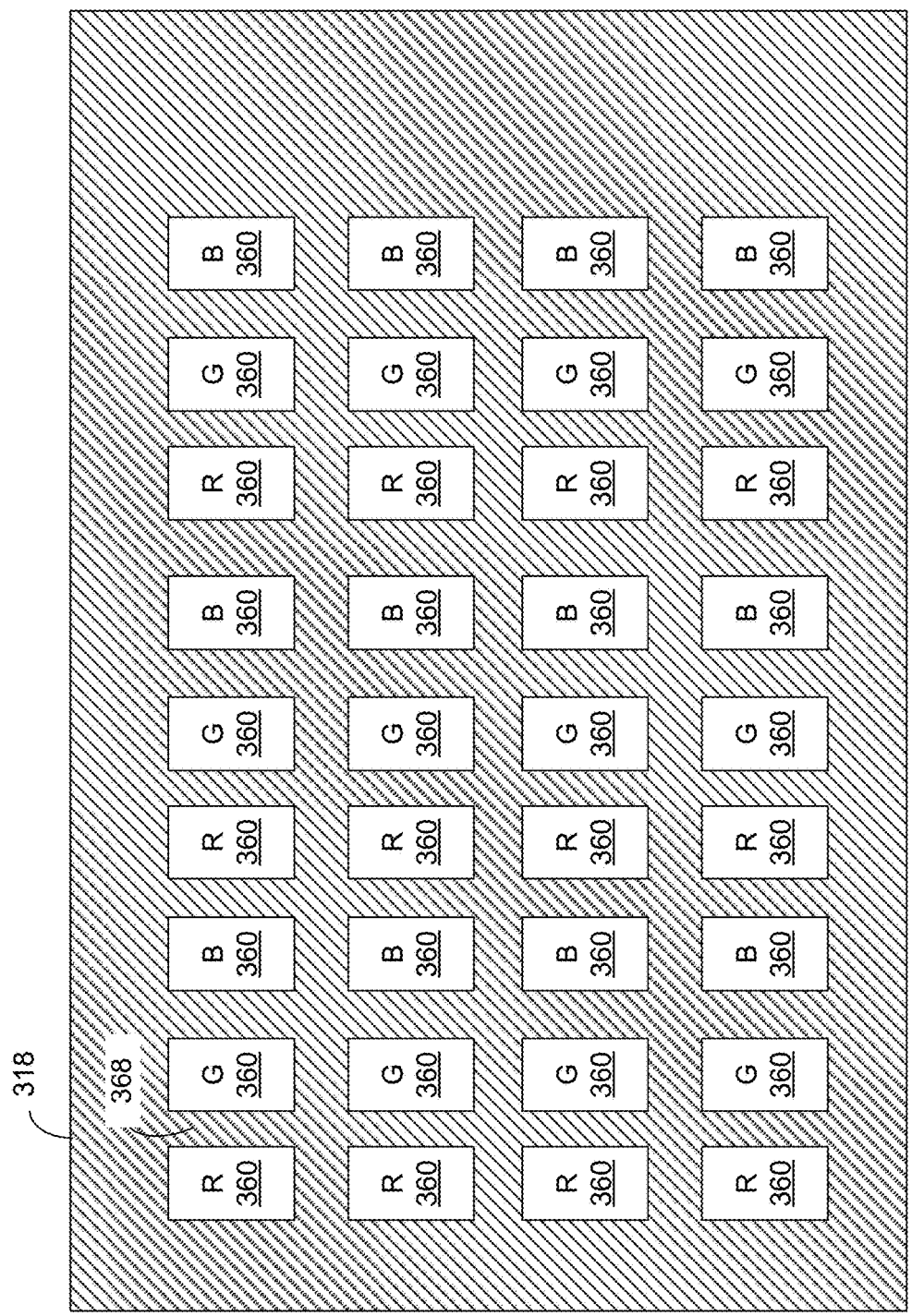
FIG. 3B is a top plan view of a dielectric mirror, in accordance with an embodiment.

FIG. 3B is a top plan view of a dielectric mirror 318 according to one embodiment. In this embodiment, the dielectric mirror 318 is implemented in a single piece to cover the entire TFT substrate 310 with openings corresponding to apertures of sub-pixels 360. Each sub-pixel emits a corresponding color of light (e.g., R, G, B). The dielectric mirror 318 also covers inter sub-pixel areas 368 between sub-pixels 360 (or apertures for the sub-pixels 360). Thus, TFTs 312 can be disposed above the dielectric mirror 318 even in the inter sub-pixel areas 368, and shielded from light traveling from the backlight unit 304.

Figure 4:
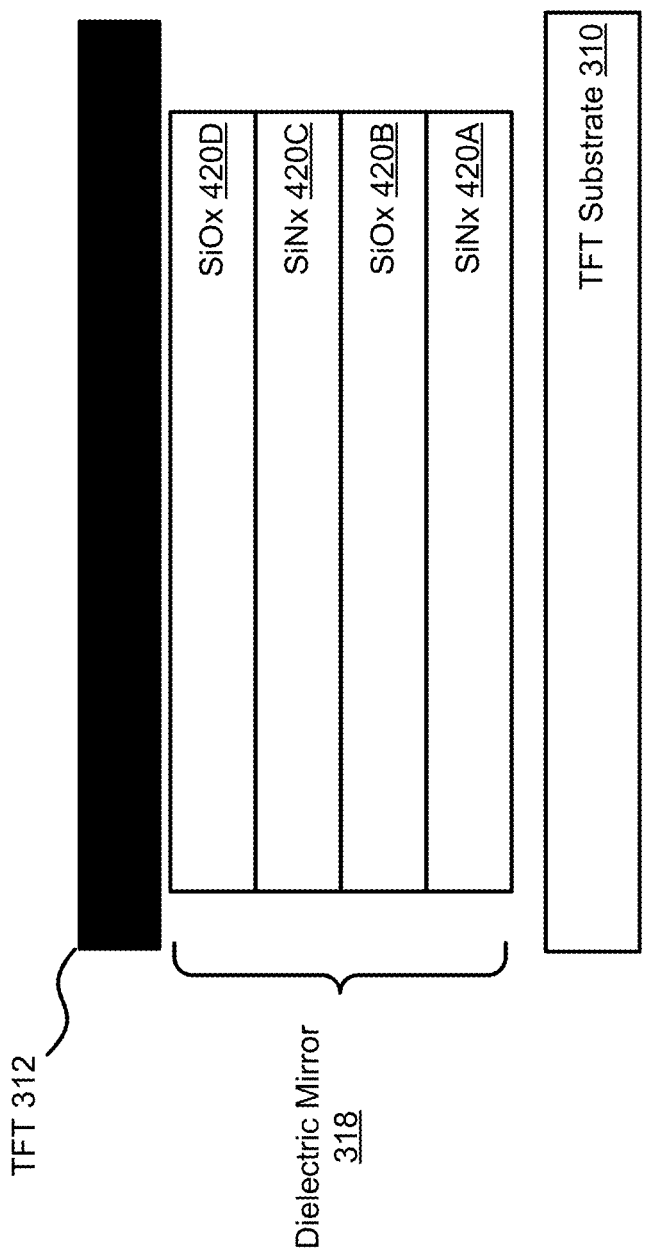
FIG. 4 a cross section diagram of the dielectric mirror, in accordance with an embodiment.

FIG. 4 a cross section diagram of the dielectric mirror 318, in accordance with an embodiment. In one embodiment, the dielectric mirror 318 includes a first layer 420A, a second layer 420B, a third layer 420C, and a fourth layer 420D, in that sequence towards the exit pupil 250. The first layer 420 may be coupled to a TFT substrate 310, and the fourth layer 420D may be coupled to a TFT 312. In other embodiments, the dielectric mirror 318 includes different, more or fewer components than shown in FIG. 4. For example, the dielectric mirror 318 may include additional layers than shown in FIG. 4.

The layers of the dielectric mirror may be composed of different materials. In one embodiment, the first layer 420A includes SiNx, the second layer 420B includes SiOx, the third layer 420C includes SiNx, and the fourth layer 420D includes SiOx. In one aspect, each of the layers 420 has a uniform height in a direction between the TFT substrate 310 and the TFT 312. For example, the uniform height is $\lambda/4$, where $\lambda$ is a target wavelength of the input light (e.g., 550 nm). Alternatively, TiOx may be used instead of SiNx.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An electronic display device comprising:
   a backlight unit configured to project light;
   a liquid crystal layer configured to receive light from the backlight unit and to control an amount of light from the backlight unit that passes through the liquid crystal layer;
   a thin film transistor (TFT) layer disposed between the backlight unit and the liquid crystal layer, the TFT layer comprising one or more TFTs each configured to cause a portion of the liquid crystal layer to control an amount of light that passes through the respective portion of the liquid crystal layer; and
   one or more dielectric mirrors each facing the backlight unit and disposed on a surface of one of the TFTs, and configured to reflect light from the backlight unit projected towards the TFTs back towards the backlight unit.

2. The electronic display device of claim 1, wherein the TFT layer further comprises a transparent TFT substrate disposed between the one or more TFTs and the backlight unit, and wherein each of the one or more dielectric mirrors is formed between the TFT substrate and its respective TFT.

3. The electronic display device of claim 1, wherein each dielectric mirror has a width larger than that of its corresponding TFT.

4. The electronic display device of claim 1, further comprising a color filter layer comprising one or more color filters each corresponding to a subpixel of the display and configured to pass through a portion of the light of the backlight unit of a particular color.

5. The electronic display device of claim 4, further comprising one or more black matrix sections comprising a light-absorbent material, wherein the one or more black matrix sections are positioned based upon locations of the one or more TFTs of the TFT layer.

6. The electronic display device of claim 4, wherein the one or more color filters are positioned based upon apertures corresponding to spaces of the TFT layer not covered by the one or more dielectric mirrors.

7. The electronic display device of claim 1, further comprising a polarizing layer configured to polarize light projected by the backlight unit.

8. The electronic display device of claim 1, wherein the one or more dielectric mirrors comprises a single dielectric mirror covering the TFT layer, the single dielectric mirror having a plurality of openings corresponding to subpixels of the electronic display, each subpixel located in an area between the one or more TFTs of the TFT layer.

9. The electronic display device of claim 1, wherein the one or more dielectric mirrors comprise a material having substantially no metallic property.

10. The electronic display device of claim 1, wherein the one or more dielectric mirrors comprise a plurality of stacked layers.

11. The electronic display device of claim 10, wherein the plurality of stacked layers comprises alternating silicon oxide and silicon nitride layers.

12. The electronic display device of claim 1, wherein the one or more dielectric mirrors comprise a silicon oxide, silicon nitride, or titanium oxide material.

13. The electronic display device of claim 1, wherein the one or more dielectric mirrors have a uniform height based upon a target wavelength of light from the backlight unit.

* * * * *

UNITED STATES PATENT AND TRADEMARK OFFICE
CERTIFICATE OF CORRECTION

| | |
|---|---|
| PATENT NO. | : 9,983,432 B1 |
| APPLICATION NO. | : 15/674395 |
| DATED | : May 29, 2018 |
| INVENTOR(S) | : Jianru Shi et al. |

Page 1 of 1

It is certified that error appears in the above-identified patent and that said Letters Patent is hereby corrected as shown below:

On the Title Page

In the Abstract (57), Line 9, after "is" delete "projectors" and insert -- projected --.

Signed and Sealed this
Nineteenth Day of February, 2019

Andrei Iancu
*Director of the United States Patent and Trademark Office*